United States Patent
Jung

(10) Patent No.: US 9,965,221 B2
(45) Date of Patent: *May 8, 2018

(54) MEMORY SYSTEM FOR CONTROLLING INPUT COMMAND PRIORITY AND OPERATION METHOD THEREFOR

(71) Applicant: SK hynix Inc., Gyeonggi-do (KR)

(72) Inventor: Byung-Soo Jung, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 100 days.

This patent is subject to a terminal disclaimer.

(21) Appl. No.: 15/157,234

(22) Filed: May 17, 2016

(65) Prior Publication Data

US 2017/0147261 A1 May 25, 2017

(30) Foreign Application Priority Data

Nov. 24, 2015 (KR) ........................ 10-2015-0164550

(51) Int. Cl.
*G06F 3/06* (2006.01)
*G06F 13/16* (2006.01)

(52) U.S. Cl.
CPC ............ *G06F 3/0659* (2013.01); *G06F 3/061* (2013.01); *G06F 3/0679* (2013.01); *G06F 13/1621* (2013.01); *G06F 13/1626* (2013.01); *G06F 13/1642* (2013.01)

(58) Field of Classification Search
CPC .......................................... G06F 13/16–13/18
See application file for complete search history.

(56) References Cited

U.S. PATENT DOCUMENTS

| | | | | |
|---|---|---|---|---|
| 6,000,001 | A * | 12/1999 | Larson | G06F 13/1642 710/244 |
| 7,716,391 | B2 | 5/2010 | Furukawa et al. | |
| 8,239,589 | B1 * | 8/2012 | Certain | G06F 13/1626 710/39 |
| 8,862,851 | B2 | 10/2014 | Toelkes et al. | |
| 8,886,872 | B1 * | 11/2014 | Norrie | G06F 17/30327 710/38 |
| 2003/0188107 | A1 * | 10/2003 | Hill | G06F 9/383 711/137 |
| 2006/0047998 | A1 * | 3/2006 | Darcy | G06F 3/061 714/6.12 |
| 2011/0179200 | A1 * | 7/2011 | Sukonik | G06F 13/1626 710/53 |
| 2012/0023295 | A1 * | 1/2012 | Nemawarkar | H04L 47/621 711/130 |
| 2013/0054875 | A1 * | 2/2013 | Ross | G06F 13/36 711/103 |
| 2014/0195699 | A1 * | 7/2014 | Sokol, Jr. | G06F 13/18 710/40 |
| 2014/0201471 | A1 * | 7/2014 | Cutter | G06F 13/1663 711/151 |
| 2016/0371025 | A1 * | 12/2016 | Park | G06F 3/0619 |

* cited by examiner

*Primary Examiner* — Nathan Sadler
(74) *Attorney, Agent, or Firm* — IP & T Group LLP

(57) ABSTRACT

A memory system may include: a controller suitable for checking a priority information on a plurality of input commands, storing the input commands having a high priority information as a first command in a first command storage unit, and storing the input commands having a low priority information as a second command in a second command storage unit, and one or more memory device suitable for operating in response to the input commands stored in the first or second command storage units.

12 Claims, 13 Drawing Sheets

MEMORY SYSTEM FOR CONTROLLING INPUT COMMAND PRIORITY AND OPERATION METHOD THEREFOR

CROSS-REFERENCE TO RELATED APPLICATIONS

This application claims priority under 35 U.S.C. § 119 to Korean Patent Application No. 10-2015-0164550 filed on Nov. 24, 2015 in the Korean Intellectual Property Office, the disclosure of which is incorporated herein by reference in its entirety.

BACKGROUND

1. Field

Exemplary embodiments of the present invention relate to a semiconductor design technology and, more particularly, to a memory system capable of effectively managing a plurality of commands provided from a host, and an operation method thereof.

2. Description of the Related Art

The computer environment paradigm has shifted to ubiquitous computing systems that may be used anytime and anywhere. Due to this, the use of portable electronic devices such as mobile phones, digital cameras, and notebook computers has rapidly increased. Portable electronic devices generally employ a memory system having one or more semiconductor memory devices used as main or auxiliary data storage devices.

Semiconductor memory devices generally provide excellent stability, durability, high information access speed, and low power consumption, since they have no moving parts. Well-known examples of semiconductor memory devices include universal serial bus (USB) memory devices, memory cards having various interfaces, and solid state drives (SSD).

SUMMARY

Various embodiments are directed to a memory system which is capable of prioritizing the execution of a plurality of commands, and an operating method thereof.

In an embodiment, a memory system may include: a controller suitable for checking a priority information on a plurality of input commands, storing the input commands having a high priority information as a first command in a first command storage unit, and storing the input commands having a low priority information as a second command in a second command storage unit; and one or more memory device suitable for operating in response to the input commands stored in the first or second command storage units.

The high priority information may request a compulsory change of an execution sequence, regardless of an input order of the input commands.

The low priority information may request that the input commands are sequentially executed according to the input order of the input commands, while requesting a flexible change of the execution sequence.

The controller may manage the first command stored in the first command storage unit in the form of a linked-list, and may manage the second command stored in the second command storage unit in the form of a tree-list.

The low priority information may include: a sequential information requesting that the input commands are sequentially executed according to the input order of the input commands; and a flexible information requesting the flexible change of the execution sequence such that the input commands are executed prior to a command having the sequential information.

The controller may store the second command having the sequential information in the second command storage unit at a level of the tree-list, which is lower than that of the second command having the flexible information.

The controller may manage the level of the tree-list of the second command having the sequential information based on logical address values corresponding thereto, and may manage the level of the tree-list of the second command having the flexible information based on logical address values corresponding thereto.

The controller may transfer the second command having the sequential information, which is not executed within a preset time after being stored in the second command storage unit, to a level of the tree-list, which is higher than that of the second command having the flexible information.

The high priority information may include: an order information requesting that the input commands must be executed prior to a command having the low priority information; and a head information requesting that the input commands must be first executed.

The controller may transmit a command stored in the first command storage unit to the memory devices, prior to a command stored in the second command storage unit.

In an embodiment, an operating method of a memory system including one or more memory device, the operating method may include: checking a priority information on a plurality of input commands; and storing the input commands having a high priority information as a first command in a first command storage unit, storing the input commands having a low priority information as a second command in a second command storage unit, and transmitting the input commands stored in the first or second command storage units for operating the memory devices.

The high priority information may request a compulsory change of an execution sequence, regardless of an input order of the input commands.

The low priority information may request that the input commands are sequentially executed according to the input order of the input commands, while requesting a flexible change of the execution sequence.

The storing of the input commands may further include: managing the first command stored in the first command storage unit in the form of a linked-list, and managing the second command stored in the second command storage unit in the form of a tree-list.

The low priority information may include: a sequential information requesting that the input commands are sequentially executed according to the input order of the input commands; and a flexible information requesting the flexible change of the execution sequence such that the input commands are executed prior to a command having the sequential information.

The managing of the second command may include storing the second command having the sequential information in the second command storage unit at a level of the tree-list, which is lower than that of the second command having the flexible information.

The managing of the second command may further include: managing the level of the tree-list of the second command having the sequential information based on logical address values corresponding thereto, and managing the level of the tree-list of the second command having the flexible information based on logical address values corresponding thereto.

The managing of the second command may further include transferring the second command having the sequential information, which is not executed within a preset time after being stored in the second command storage unit, to a level of the tree-list, which is higher than that of the second command having the flexible information.

The high priority information may include: an order information requesting that the input commands must be executed prior to a command having the low priority information; and a head information requesting that the input commands must be first executed.

The transmitting of the input commands may include transmitting a command stored in the first command storage unit to the memory devices, prior to a command stored in the second command storage unit.

DETAILED DESCRIPTION

Figure 1:
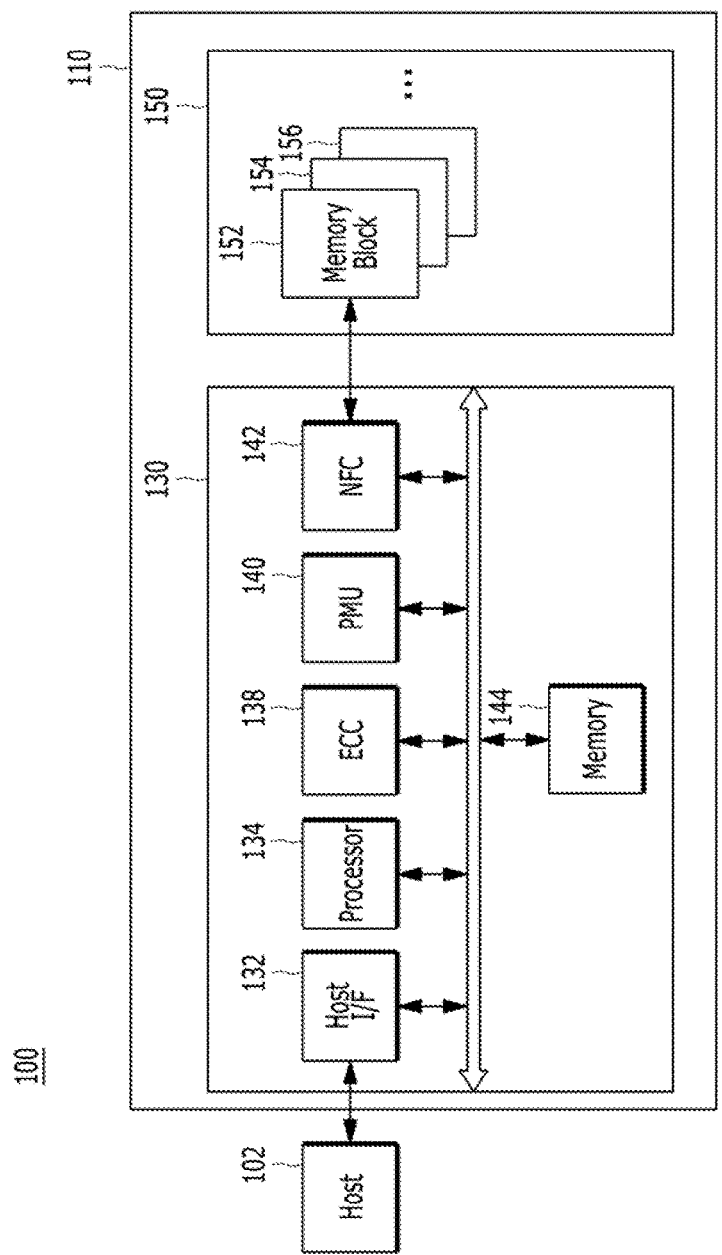
FIG. 1 is a diagram illustrating a data processing system including a memory system, in accordance with an embodiment of the invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the present invention to those skilled in the art. Throughout the disclosure, like reference numerals refer to like parts throughout the various figures and embodiments of the present invention.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC) a memory stick, a multimedia card (MMC), an RS-MMC and a micro-MMC, a secure digital (SD) card, a mini-SD a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory such as a NAND flash memory is employed as the memory device 150, a program failure may occur during a write operation due to inherent characteristics of a NAND logic function. During a bad block management, the data of the program-failed memory blocks (e.g., the bad memory blocks) may be programmed into a new memory block. The bad blocks due to a program fail may seriously deteriorate the utilization efficiency of a memory device, especially one having a 3D stack structure and thus negatively affect the reliability of the memory system 110.

Figure 2:
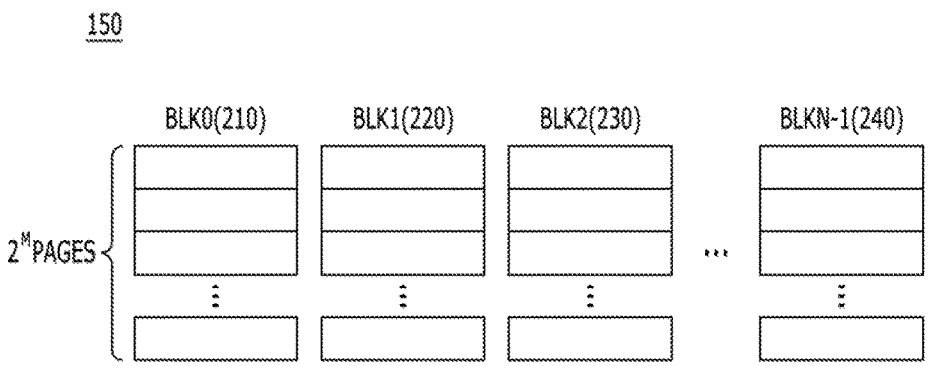
FIG. 2 is a diagram illustrating an example of a memory device employed in the memory system shown in FIG. 1.

Referring to FIG. 2 the memory device 150 may include a plurality of memory blocks, for example, zeroth to $(N-1)^{th}$ blocks 210 to 240, where N is a positive integer. Each of the plurality of memory blocks 210 to 240 may include a plurality of pages, for example, $2^M$ number of pages ($2^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
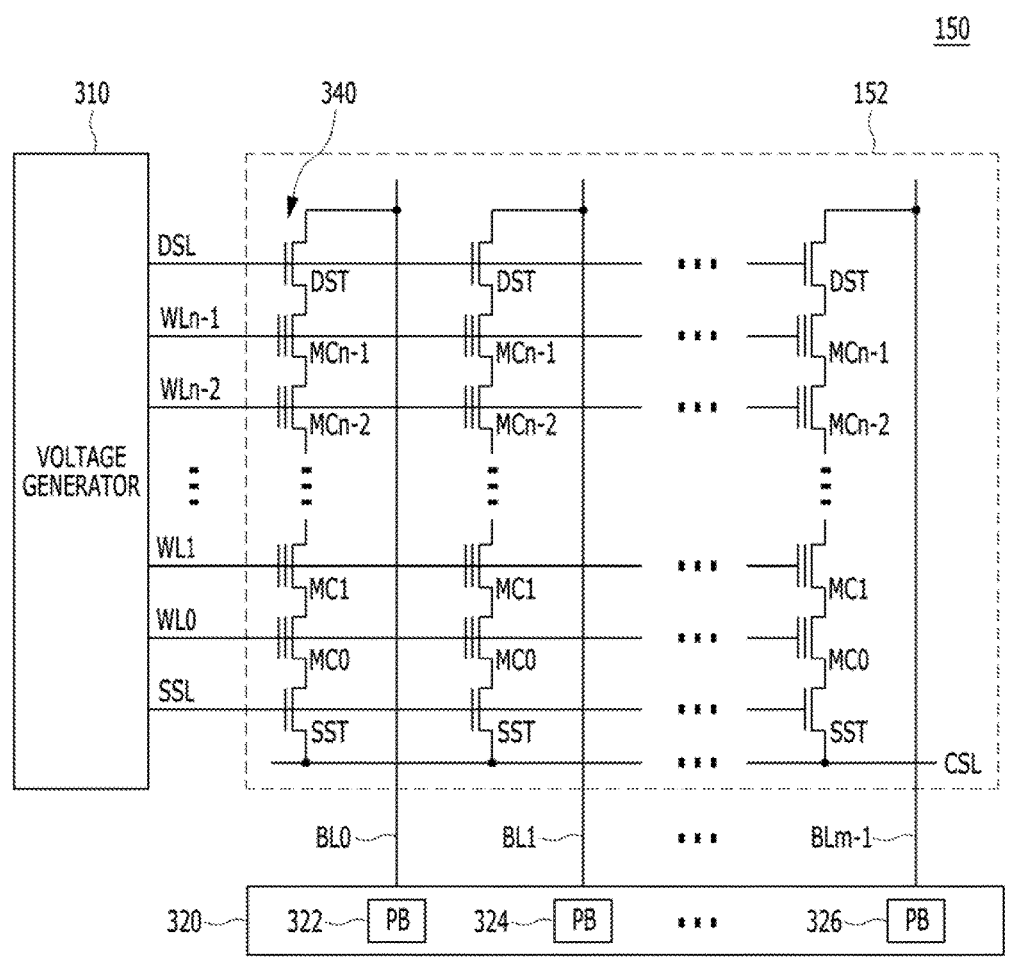
FIG. 3 is a circuit diagram illustrating an example configuration of a memory block of the memory device of FIG. 2.

Referring to FIG. 3, a memory block 152 of the memory device 150 may include a plurality of cell strings 340 coupled electrically to bit lines BL0 to BLm−1, respectively. Each cell string 340 may include at least one drain select transistor DST and at least one source select transistor SST. A plurality of memory cells or a plurality of memory cell transistors MC0 to MCn−1 may be coupled electrically in series between the select transistors DST and SST. The respective memory cells MC0 to MCn−1 may consist of multi-level cells (MLC) each of which stores data information of a plurality of bits. The memory cells may have any suitable architecture.

In FIG. 3, 'DSL' denotes a drain select line 'SSL' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines under the control of the control circuit.

Figure 4:
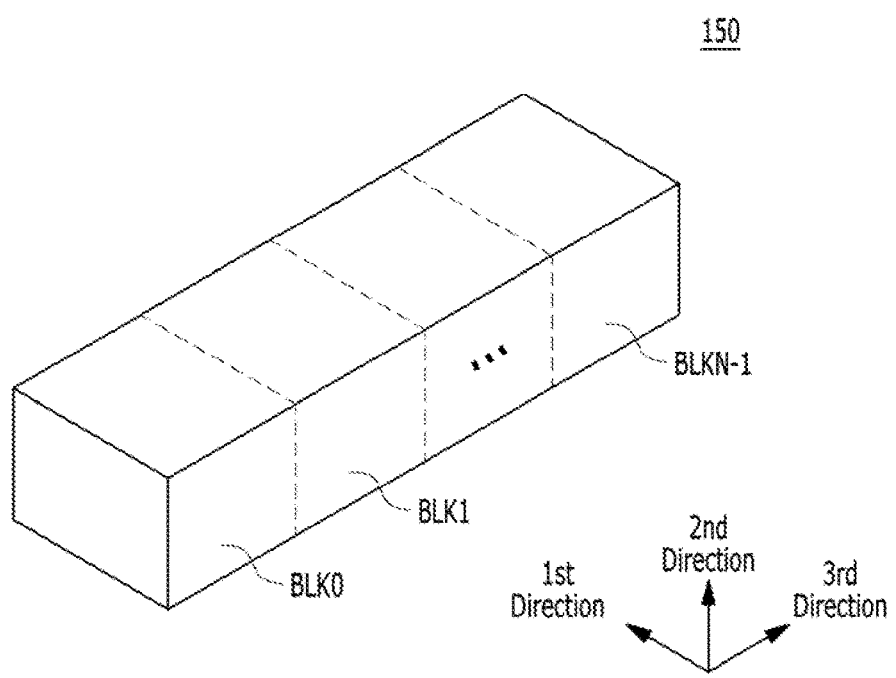
FIGS. 4 to 11 are diagrams schematically illustrating examples of various aspects of the memory device shown in FIG. 2.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit Ines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown). FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN−1. Each of the memory blocks BLK0 to BLKN−1 may be realized in a 3D structure or a vertical structure. The respective memory blocks BLK0 to BLKN−1 may include a plurality of structures extending in first to third directions, for example, an x-axis direction, a y-axis direction and a z-axis direction.

Figure 8:
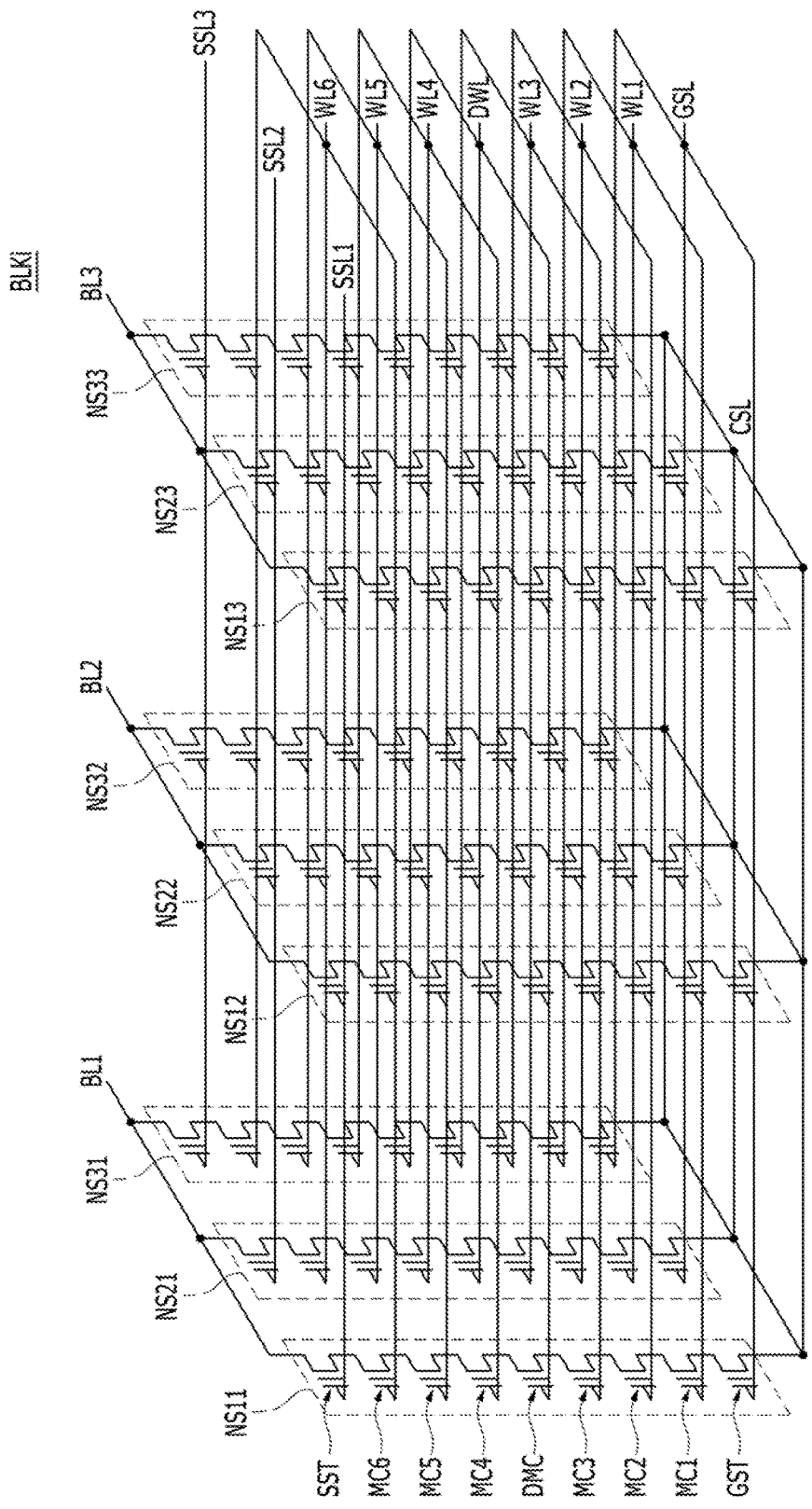

The respective memory blocks BLK0 to BLKN−1 may include a plurality of NAND strings NS extending in the second direction (FIG. 8). The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN−1 may be coupled electrically to a plurality of bit lines BL, a plurality of source select lines SSL, a plurality of ground select lines GSL, a plurality of word fines WL, a plurality of dummy word lines DWL, and a plurality of common source lines CSL.

Figure 5:
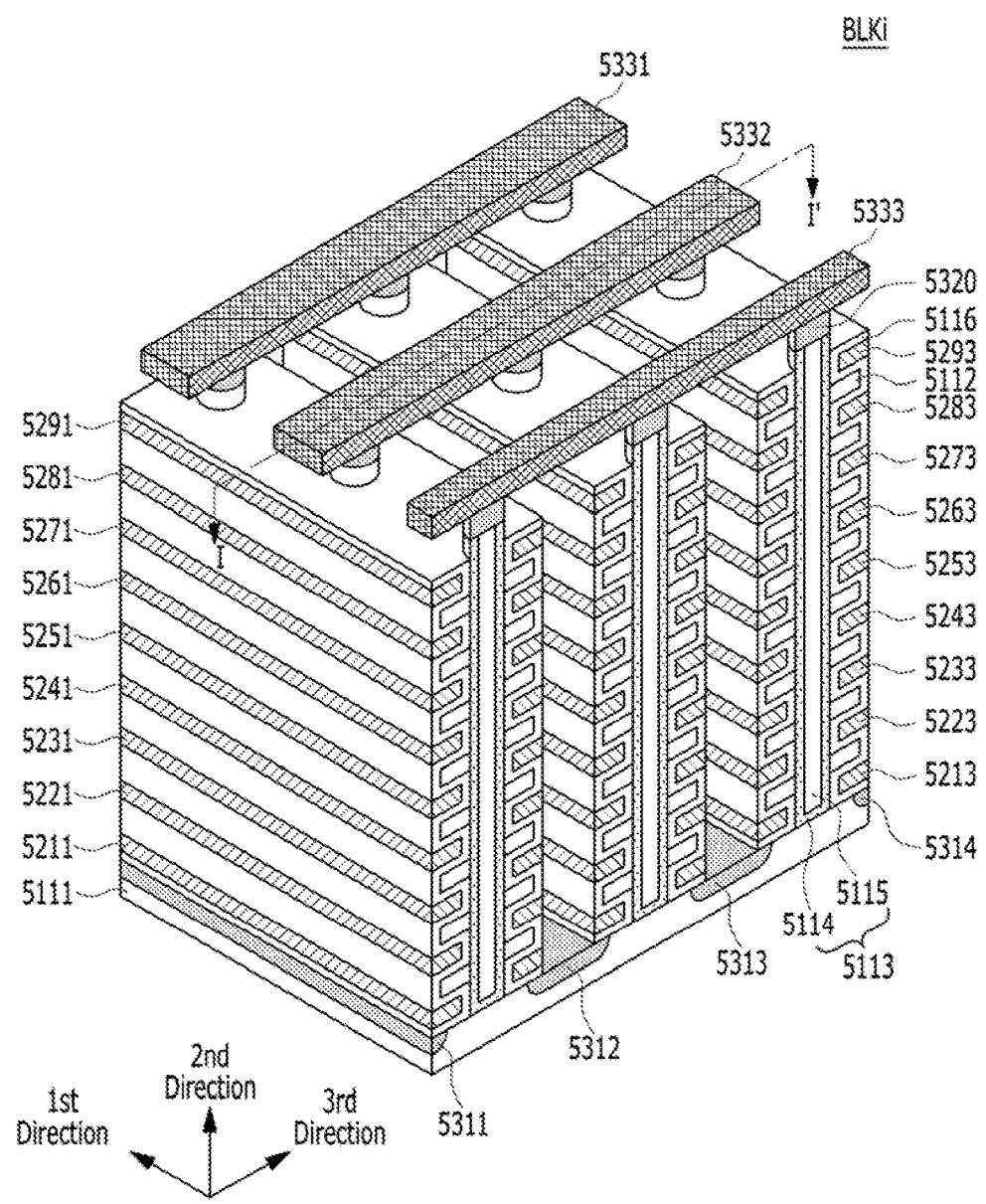
Figure 6:
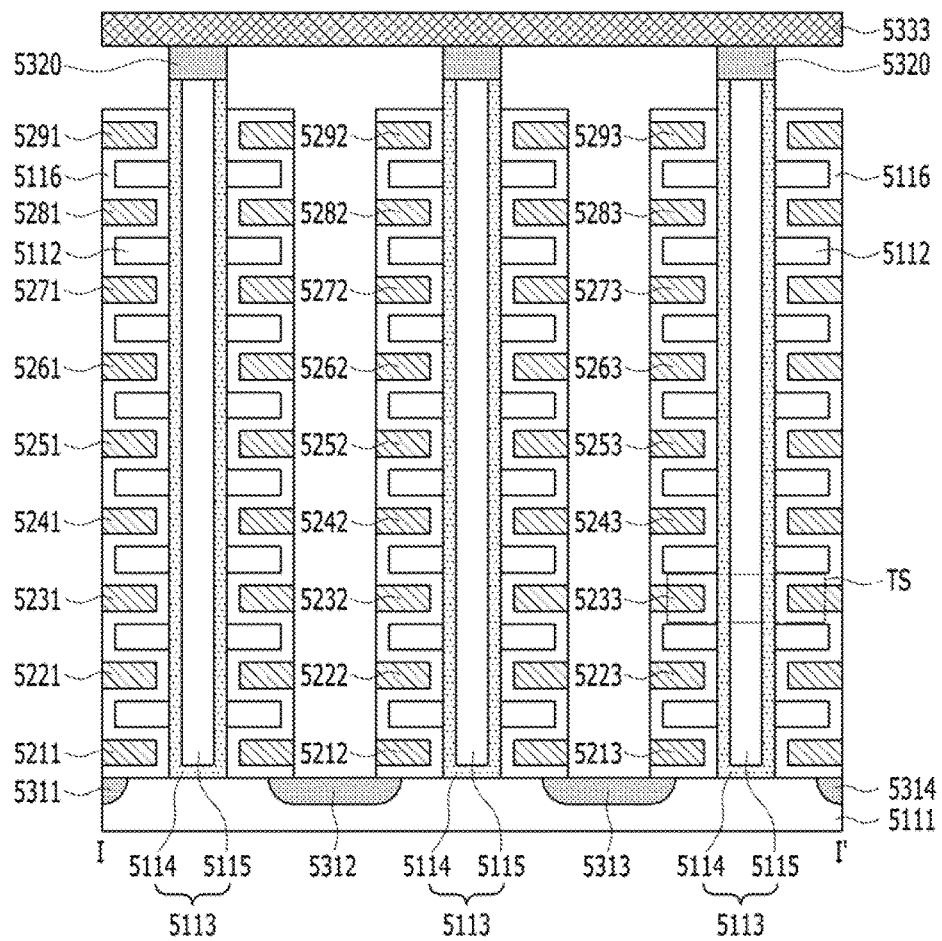

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon, it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
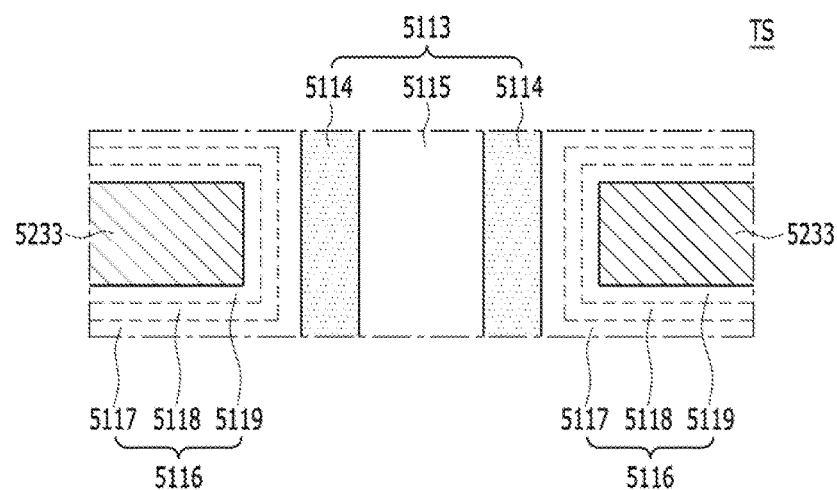

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5115.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive its material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one-bit line BL, it is noted that the embodiment is not limited thereto. In the memory block BLKi, m NAND, strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8 the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected. Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
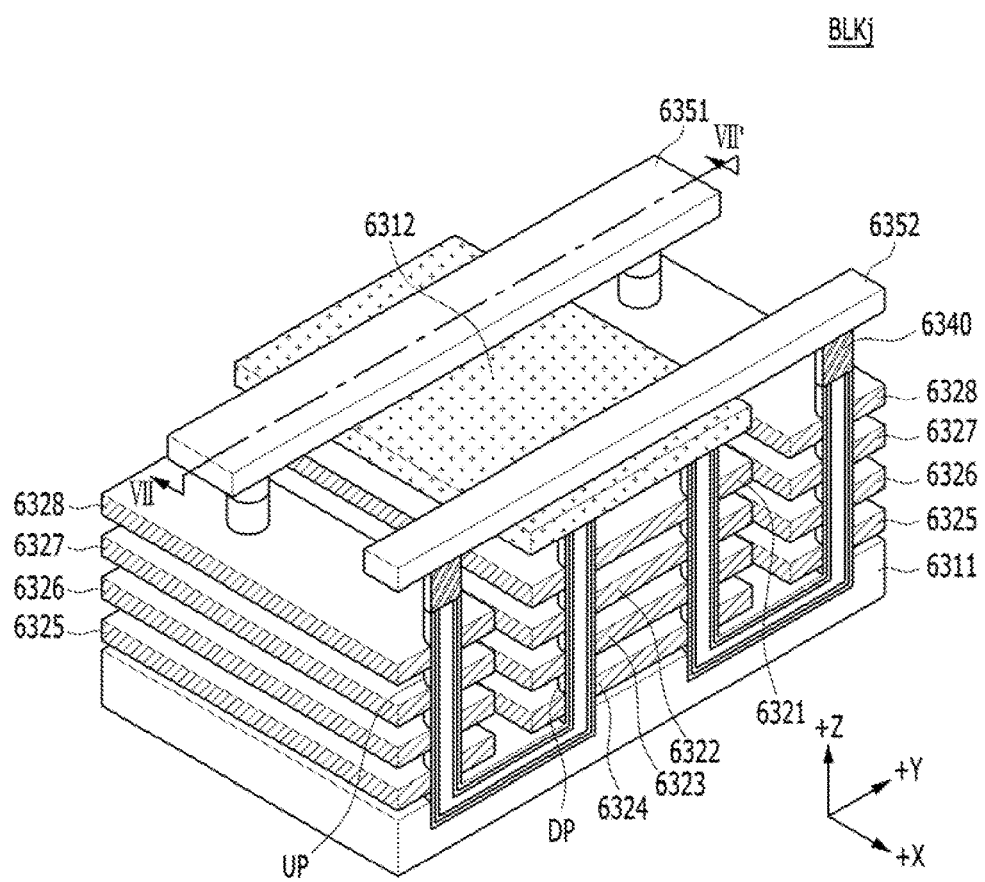

FIG. 9 is perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
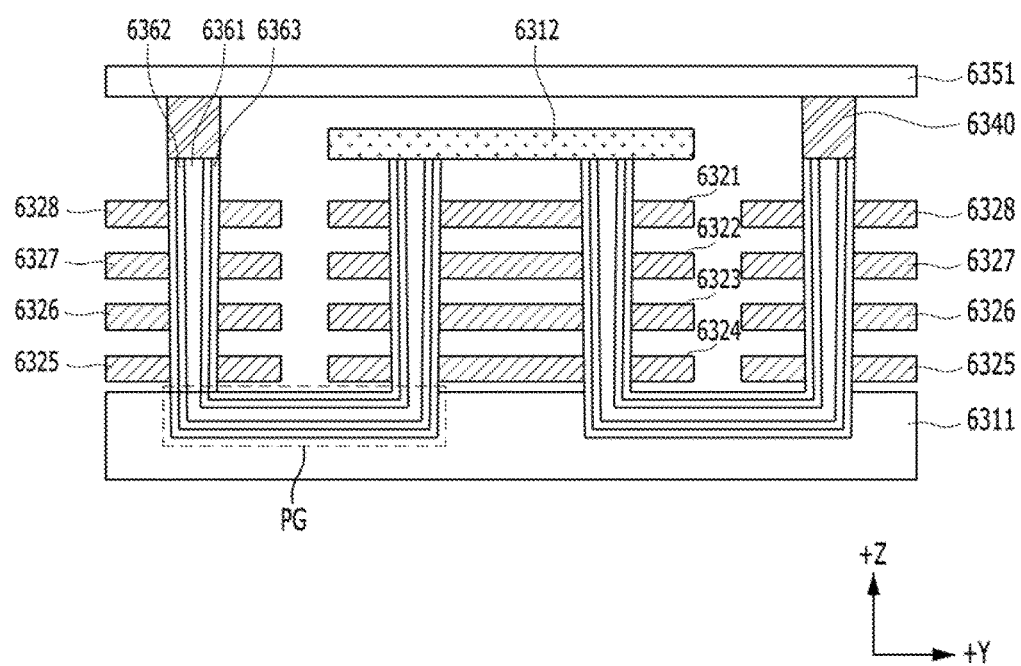

Referring to FIGS. 9 and 10 the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL, The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
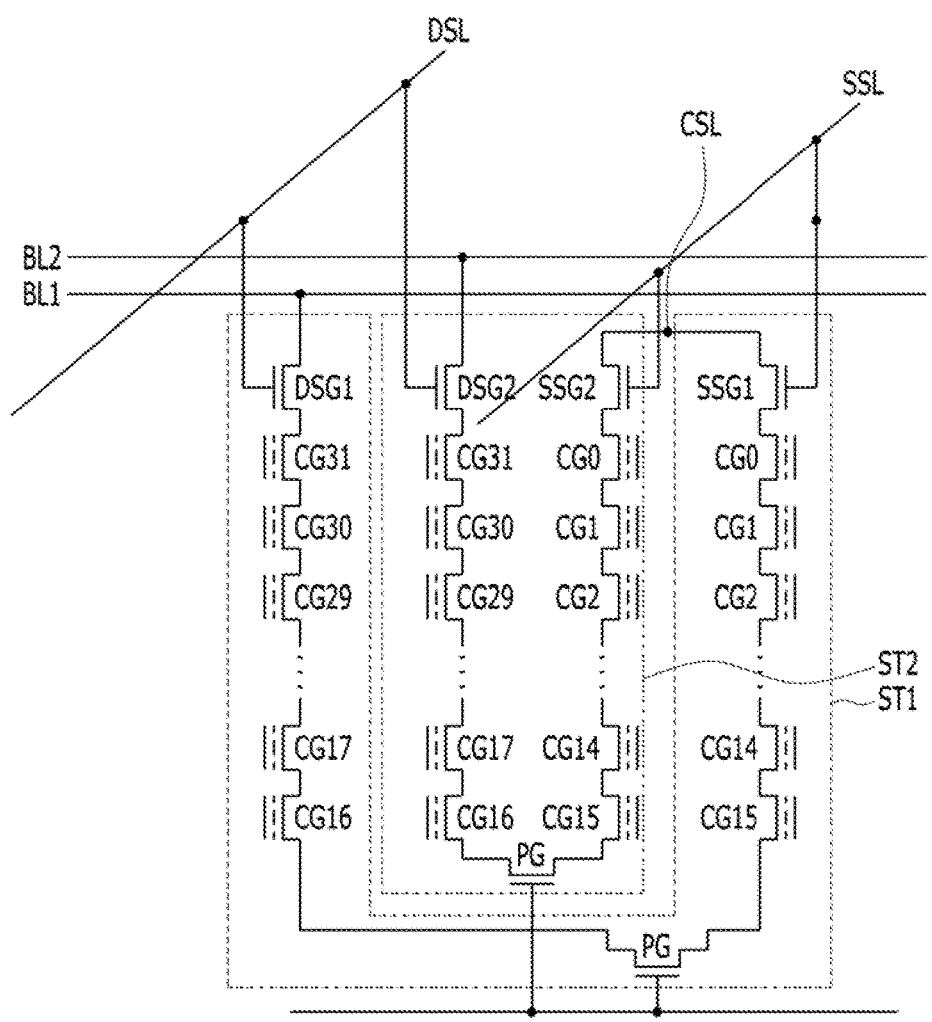

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example at least one source select gate SSG2 and at least one drain select gate DSG2 may form a second string ST2.

The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Figure 12A:
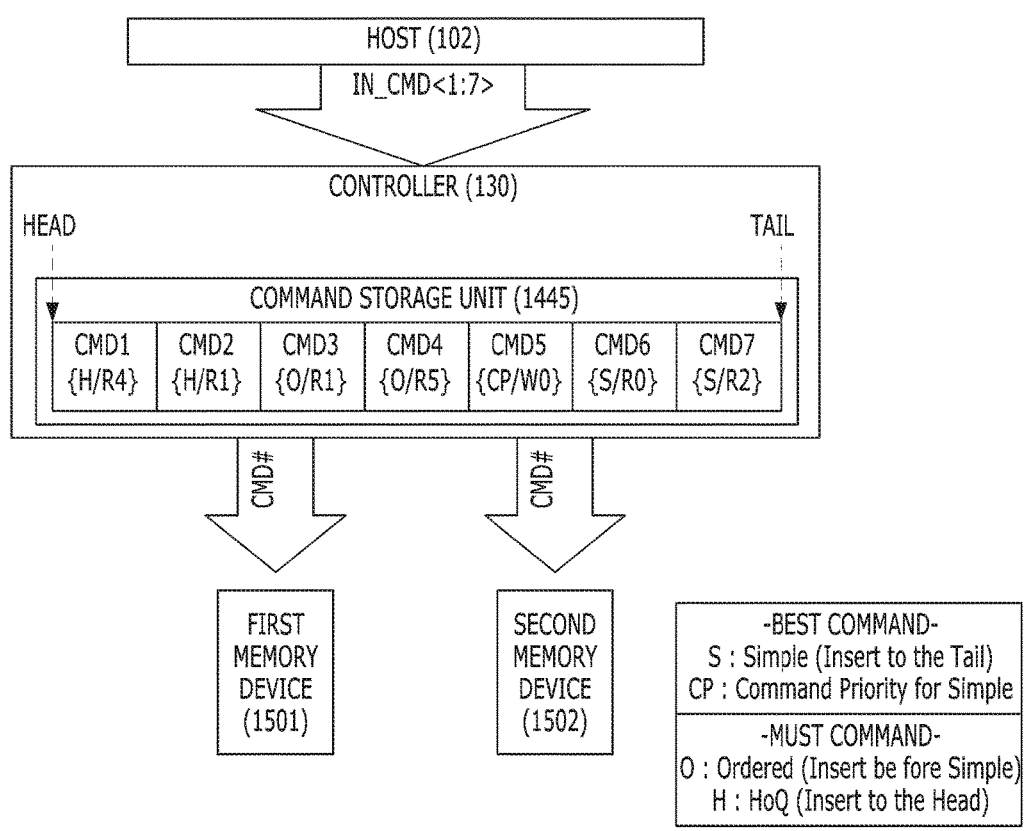
FIGS. 12A and 12B are schematic diagrams illustrating a command management system and method of the memory system in accordance with an embodiment of the present invention.
Figure 12B:
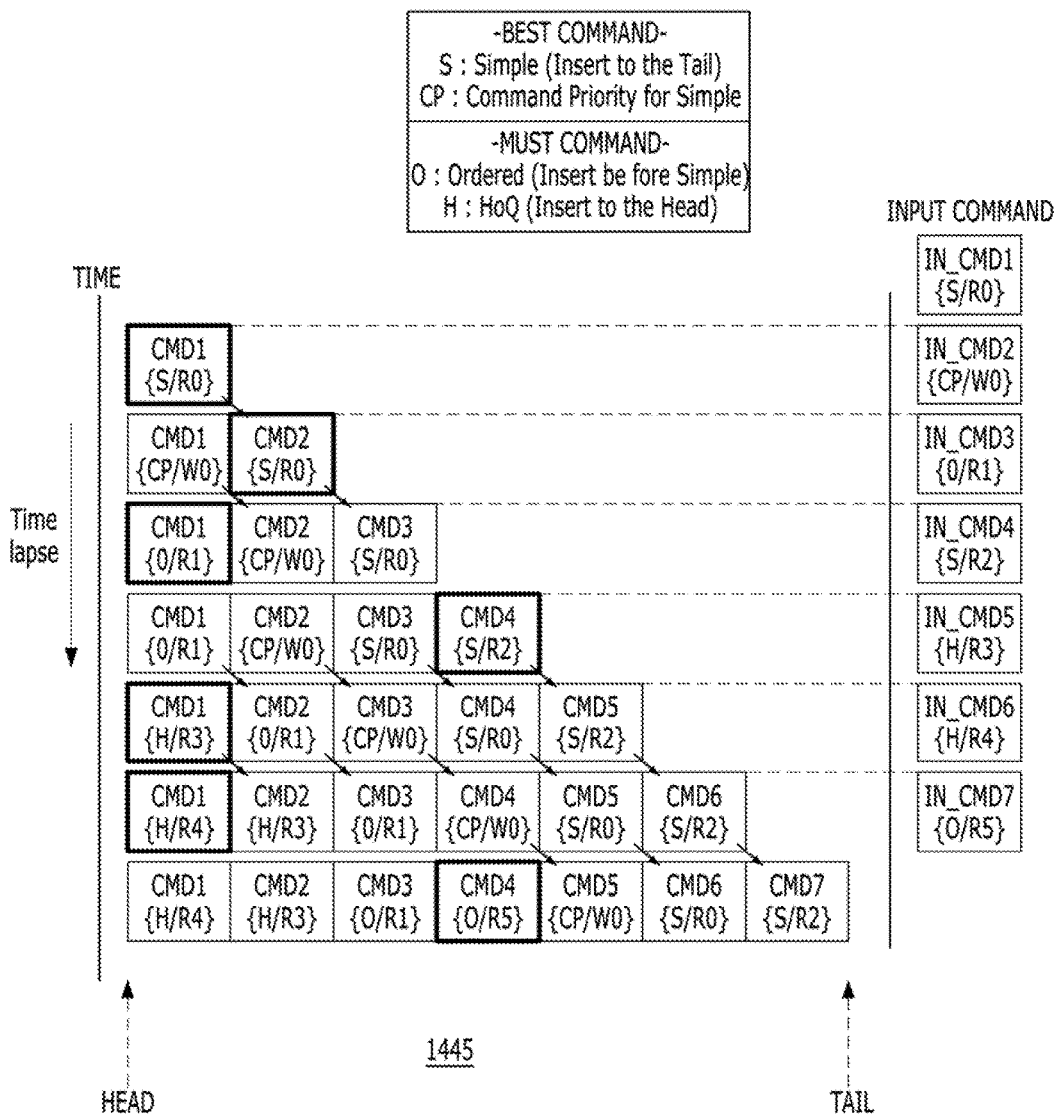

FIGS. 12A and 12B are schematic diagrams illustrating command management of the memory system 110, in accordance with an embodiment of the present invention.

FIG. 12A illustrates the memory system 110 including a plurality of memory devices 1501 and 1502 and the controller 130.

Each of the memory devices 1501 and 1502 may correspond to the memory device 150 described with reference to FIG. 1.

The controller 130 may, in addition to the features described earlier, further include a command storage unit 1445 for storing a plurality of input commands IN_CMD<1:7> received from the host 102 as a plurality of commands CMD<1:7>. The controller 130 may control the command storage unit 1445 to store the plurality of commands CMD<1:7> in a form of a linked-list in which the plurality of commands CMD<1:7> are sequentially linked.

The command storage unit 1445 may be provided in the memory 144 of the controller 130. However, the command storage unit 1445 may be included as a separate component, or in another component operatively inked to the memory 144.

The controller 130 may transmit the stored commands CMD<1:7> to the plurality of memory devices 1501 and 1502 as commands CMD# for controlling the operations of the respective memory devices 1501 and 1502.

Each of the input commands IN_CMD<1:7> inputted to the command storage unit 1445 may include 'priority information' representing process priority of the corresponding the input commands. That is, when the host 102 generates the plurality of input commands IN_CMD<1:7>, the host 102 may include 'priority information' in the plurality of input commands IN_CMD<1:7>, in order to designate with which priority the generated commands are to be executed.

The priority information included in each of the input commands IN_CMD<1:7> which are inputted to the command storage unit 1445 of the controller 130 from the host 102 may have the following types.

First, the priority information may include high priority information MUST COMMAND which requests a compulsory change of an execution sequence, regardless of an input order of the input commands are transmitted to the command storage unit 1445 of the controller 130 from the host 102.

Second, the priority information may include low priority information BEST COMMAND which requests that the input commands are sequentially executed according to the input order of the input commands, while requesting a flexible change of the execution sequence are transmitted to the command storage unit 1445 of the controller 130 from the host 102.

Specifically, the high priority information MUST COMMAND may include order information O (Order) and head information H (Head). The order information O requesting that the input commands must be executed prior to a command having the low priority information BEST COMMAND, and the head information H requesting that the input commands must be first executed.

Thus, when a command including the order information O is inputted to the command storage unit 1445 of the controller 130 from the host 102, the command must be inserted ahead of a command having the low priority information BEST COMMAND.

Furthermore, when a command including the head information H is inputted to the command storage unit 1445 of the controller 130 from the host 102, the command must be inserted the head.

The low priority information BEST COMMAND may include sequential information S (Simple) and flexible information CP (Command Priority). The sequential information S requesting that the input commands are sequentially executed according to the input order of the input commands are transmitted to the command storage unit 1445 of the controller 130 from the host 102 and the flexible information CP requesting the flexible change of the execution sequence such that the input commands are executed prior to a command having the sequential information S.

Thus, when a command having the sequential information S is inputted to the command storage unit 1445 of the controller 130 from the host 102, the command may be inserted to the tail.

Furthermore, when a command having the flexible information CP is inputted to the command storage unit 1445 of the controller 130 from the host 102, the command may be inserted as ahead of a command having the sequential information S as possible. However, the flexible information CP has no compulsion, unlike the above-described high-level priority information MUST COMMAND.

That is, the command having the flexible information CP may be inserted behind the command having the sequential information S, according to the condition of the command having the sequential information S, which has been previously inputted.

For example, when it is confirmed that a specific command having the sequential information S, which had been inputted before the point of time that a command having the flexible information CP was inputted, was not executed even after a preset time has elapsed from the point of time that the specific command was inputted, the specific command having the sequential information S may be set to be executed prior to the command having the flexible information CP.

FIG. 12B illustrates how the plurality of input commands IN_CMD<1:7> having the priority information and generated by the host 102 as illustrated in FIG. 12A are inputted as the plurality of commands CMD<1:7> to the command storage unit 1445 of the controller 130.

Specifically, the first input command IN_CMD1 among the plurality of input commands IN_CMD<1:7> applied to the controller 130 from the host 102 may contain the sequential information S as the priority information, and request a read operation R0 for the zeroth logical address.

At this time, since the command storage unit 1445 is empty at the point of time that the first input command IN_CMD1 inputted, the first input command IN_CMD1 may be stored as the first command CMD1 into the head of the command storage unit 1445.

The second input command IN_CMD2 may contain the flexible information CP as the priority information, and request a write operation W0 for the zeroth logical address.

At this time, the first command CMD1 having the sequential information S may be stored in the head of the command storage unit 1445 at the point of time that the second input command IN_CMD2 is inputted. Since the second input command IN_CMD2 contains the flexible information CP, the first command CMD1 which has been stored in the head of the command storage unit 1445 may be shifted and stored as the second command CMD2, and the second input command IN_CMD2 may be stored as the new first command CMD1 in the head of the command storage unit 1445.

The third input command IN_CMD3 may contain the order information O as the priority information, and request a read operation R1 for the first logical address.

At this time, the first command CMD1 having the flexible information CP and the second command CMD2 having the sequential information S may be stored from the head of the command storage unit 1445 at the point of time that the third input command IN_CMD3 is inputted. Since the third input and IN_CMD3 contains the order information O, the first and second commands CMD1 and CMD2 which have been stored from the head of the command storage unit 1445 may be shifted and stored as the second and third commands CMD2 and CMD3, and the third input command IN_CMD3 may be stored as the new first command CMD1 into the head of the command storage unit 1445.

The fourth input command IN_CMD4 may contain the sequential information S as the priority information, and request a read operation R2 for the second logical address.

At this time, the first command CMD1 having the order information O, the second command CMD2 having the flexible information CP, and the third command CMD3 having the sequential information S may be sequentially stored from the head of the command storage unit 1445 at the point of time that the fourth input command IN_CMD4 is inputted. Since the fourth input command IN_CMD4 contains the sequential information S, the fourth input command IN_CMD4 may be stored as the fourth command CMD4 behind the third command CMD3 of the command storage unit 1445.

The fifth input command IN_CMD5 may contain the head information H as the priority information, and request a read operation R3 for the third logical address.

At this time, the first command CMD1 having the order information O, the second command CMD2 having the flexible information CP, the third command CMD3 having the sequential information S, and the fourth command CMD4 having the sequential information S may be stored from the head of the command storage unit 1445 at the point of time that the fifth input command IN_CMD5 is inputted. Since the fifth input command IN_CMD5 contains the head information H, the first to fourth commands CMD1 to CMD4 which have been stored from the head of the command storage unit 1445 may be shifted and stored as the second to fifth commands CMD2 to CMD5, and the fifth input command IN_CMD5 may be stored as the new first command CMD1 into the head of the command storage unit 1445.

The sixth input command IN_CMD6 may contain the head information H as the priority information, and request a read operation R4 for the fourth logical address.

At this time, the first command CMD1 having the head information H, the second command CMD2 having the order information O, the third command CMD3 having the flexible information CP, the fourth command CMD4 having the sequential information S and the fifth command CMD5 having the sequential information S may be stored from the head of the command storage unit 1445 at the point of time that the sixth input command IN_CMD6 is inputted. Since the sixth input command IN_CMD6 contains the head information H, the first to fifth commands CMD1 to CMD5 which have been stored from the head of the command storage unit 1445 may be shifted and stored as the second to sixth commands CMD2 to CMD6, and the sixth input command IN_CMD5 may be stored as the new first command CMD1 into the head of the command storage unit 1445.

The seventh input command IN_CMD7 may contain the order information O as the priority information, and request a read operation R5 for the fifth logical address.

At this time, the first command CMD1 having the head information H, the second command CMD2 having the head information H, the third command CMD3 having the order information O, the fourth command CMD4 having the flexible information CP, the fifth command CMD5 having the sequential information S, and the sixth command CMD6 having the sequential information S may be stored from the head of the command storage unit 1445 at the point of time that the seventh input command IN_CMD7 is inputted. Since the seventh input command IN_CMD7 contains the order information O, the fourth to sixth commands CMD4 to CMD6 which have been stored in the middle of the command storage unit 1445 may be shifted and stored as the fifth to seventh commands CMD5 to CMD7, and the seventh input command IN_CMD7 may be stored as the new fourth command CMD4 ahead of the fifth command CMD5 in the command storage unit 1445.

As described above, the sequence in which the plurality of input commands applied from the host 102 are inputted to the command storage unit 1445 of the controller 130 may be varied according to the priority information contained in each of the input commands IN_CMD<1:7>.

Figure 13A:
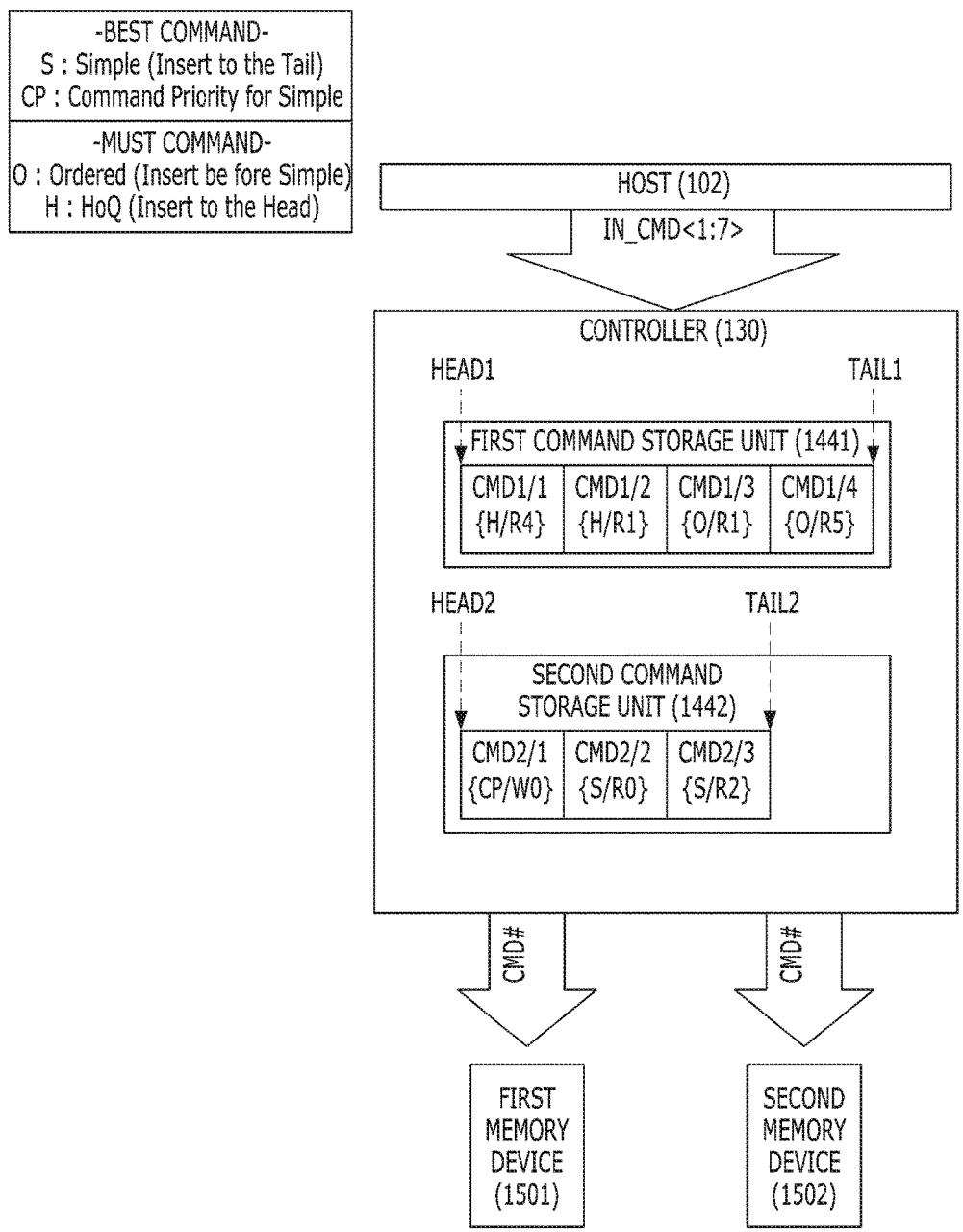
FIGS. 13A and 13B are schematic diagrams illustrating a command management system and method of the memory system in accordance with another embodiment of the present invention.
Figure 13B:
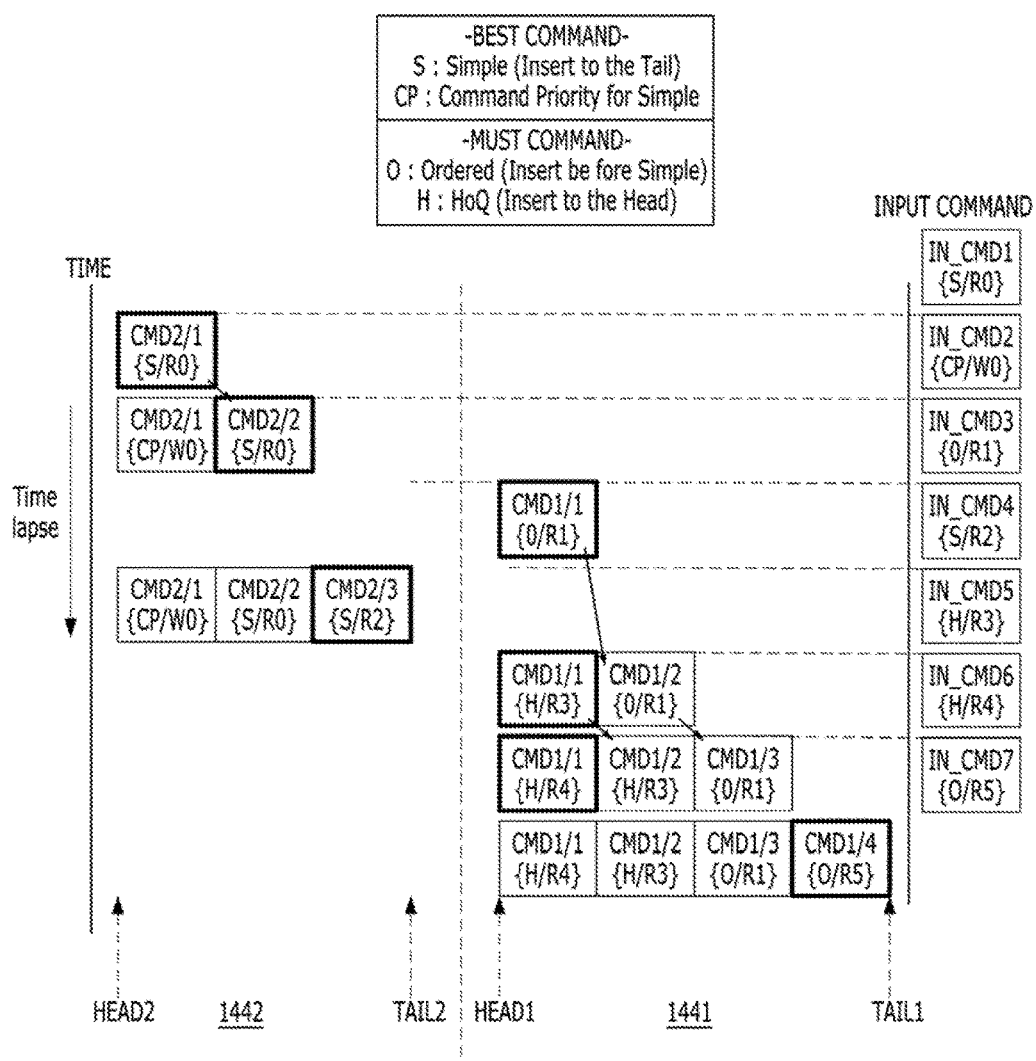

FIGS. 13A and 13B are schematic diagrams illustrating a command management system and method of the memory system 110 in accordance with another embodiment of the present invention.

The memory system 110 shown in FIG. 13A may be the same as the memory system 110 described with reference to FIG. 12A except for first and second command storage units 1441 and 1442.

Each of the memory devices 1501 and 1502 may correspond to the memory device 150 described with reference to FIG. 4.

The controller 130 may be configured in the same manner as the controller 130 described with reference to FIG. 1. At this time, the plurality of input commands IN_CMD<1:7> applied from the host 102 may be distributed and stored into first and second command storage units 1441 and 1442 included in the controller 130.

The controller 130 may select commands having a higher priority than a preset level among the plurality of input commands IN_CMD<1:7> applied from the host 102, and store the selected commands in the first command storage unit 1441. At this time, the controller 130 may manage the commands CMD1/1, CMD1/2, CMD1/3, and CMD1/4 stored in the first command storage unit 1441 in the form of a linked-list in which the commands CMD1/1, CMD1/2, CMD1/3, and CMD1/4 are sequentially linked and managed from the head HEAD1 to the tail TAIL1.

Furthermore, the controller 130 may select commands having a lower priority than the preset level among the plurality of input commands IN_CMD<1:7> applied from the host 102, and store the selected commands in the second command storage unit 1442. At this time, the controller 130 may manage the commands CMD2/1, CMD2/2, and CMD2/3 stored in the second command storage unit 1442 in the form of a tree-list from the head HEAD2 to the tail TAIL2.

The first and second command storage units 1441 and 1442 may be positioned in the memory 144 of the controller 130, but may also included as a separate component, or in another component operatively linked to the memory 144.

The controller 130 may distribute and store the plurality of input commands IN_CMD<1:7> applied form the host 102 into the first and second command storage units 1441 and 1442, and transmit the stored commands CMD1/1, CMD1/2, CMD1/3 and CMD1/4 and CMD2/1, CMD2/2, and CMD2/3 to the plurality of memory devices 1501 and 1502 as commands CMD# in order to control the operations of the memory devices 1501 and 1502. That is, each of the memory devices 1501 and 1502 may be controlled in response to a command CMD# received from the first or second command storage unit 1441 or 1442 through the controller 130.

At this time, since the commands CMD1/1, CMD1/2, CMD1/3, and CMD1/4 having a higher priority than the preset level are stored in the first command storage unit 1441 and the commands CMD2/1, CMD2/2 and CMD2/3 having a lower priority than the preset level are stored in the second command storage unit 1442, the controller 130 may control the commands such that the commands CMD1/1, CMD1/2, CMD1/3, and CMD1/4 stored in the first command storage unit 1441 can be transmitted to the memory devices 1501 and 1502 prior to the commands CMD2/1, CMD2/2, and CMD2/3 stored in the second command storage unit 1442. For example, the controller 130 may confirm that no commands are stored in the first command storage unit 1441, and then transmit the commands stored in the second command storage unit 1442 to the memory devices 1501 and 1502.

Each of the input commands IN_CMD<1:7> which are distributed and inputted to the first and second command storage units 1441 and 1442 of the controller 130 from the host 102 may include 'priority information'. That is, when the host 102 generates the plurality of input commands IN_CMD<1:7>, the host 102 may include the priority information in the plurality of input commands IN_CMD<1:7>, in order to designate with which priority the generated commands are to be executed.

The priority information included in each of the input commands IN_CMD<1:7> which are distributed and inputted to the first and second command storage units 1441 and 1442 of the controller 130 from the host 102 may have the following types.

First, the priority information may include high priority information MUST COMMAND which requests a compulsory change of an execution sequence, regardless of an input order of the input commands are transmitted to the command storage unit 1445 of the controller 130 from the host 102. At this time, the controller 130 may check the priority information of the input commands IN_CMD<1:7> inputted to the controller 130 from the host 102, and input commands having the high priority information MUST COMMAND only to the first command storage unit 1441.

Second, the priority information may include low priority information BEST COMMAND which requests that the input commands are sequentially executed according to the input order of the input commands, while requesting a flexible change of the execution sequence are transmitted to the command storage unit 1445 of the controller 130 from the host 102. At this time, the controller 130 may check the priority information of the input commands IN_CMD<1:7> inputted to the controller 130 from the host 102, and input commands having the low priority information BEST COMMAND only to the second command storage unit 1442.

Specifically, the high priority information MUST COMMAND may include order information O (Order) and head information H (Head). The order information O requesting that the input commands must be executed prior to a command having the low priority information BEST COMMAND, and the head information H requesting that the input commands must be first executed.

Thus, in order that a command having the order information O can be unconditionally executed prior to a command having the low priority information BEST COMMAND, the controller 130 may input the command having the order information O to the first command storage unit 1441.

Furthermore, in order that a command having the head information H can be unconditionally executed at the head, the controller 130 not only may input the command having the head information H to the first command storage unit 1441, but also must insert the command having the head information H to the head HEAD1 of the first command storage unit 1441.

At this time, the controller 130 may use a control method that always transmits the commands CMD1/1, CMD1/2, CMD1/3, and CMD1/4 stored in the first command storage unit 1441 to the memory devices 1501 and 1502, prior to the commands CMD2/1, CMD2/2, and CMD2/3 stored in the second command storage unit 1442.

Thus, through the operation of simply inputting the command having the order information O and the command having the head information H to the first command storage unit 1441, the command having the order information O can be unconditionally executed prior to a command having the low priority information BEST COMMAND.

The low priority information BEST COMMAND may include sequential information S and flexible information CP. The sequential information S requesting that the input commands are sequentially executed according to the input order of the input commands are transmitted to the controller 130 from the host 102, and the flexible information CP requesting the flexible change of the execution sequence such that the input commands are executed prior its to a command having the sequential information S.

Thus, in order that a command having the sequential information S can be sequentially executed according to the point of time that the command is inputted, the controller 130 may not only input the command having the sequential information S to the second command storage unit 1442, but also insert the command to the tail TAIL2 of the second command storage unit 1442.

Furthermore, in order that a command having the flexible information CP can be executed as prior to a command having the sequential information S as possible, the controller 130 may not only input the command having the flexible information CP to the second command storage unit 1442, but also insert the command to the head HEAD2 of the second command storage unit 1442.

At this time, when the command having the flexible information CP is executed as prior to the command having the sequential information S as possible, it may indicate that the command having the flexible information CP can be inserted behind a command having the sequential information S according to the situation of the command having the sequential information S, which has been previously inputted.

For example, when it is confirmed that a specific command having the sequential information S, which had been inputted before the point of time that a command having the flexible information CP was inputted, was not executed even after a preset time has elapsed from the point of time that the command was inputted, the specific command having the sequential information S may be set to be executed prior to the command having the flexible information CP.

FIG. 13B illustrates how the plurality of input commands IN_CMD<1:7> having the flexible information and generated by the host 102 as illustrated in FIG. 13A are inputted to the first and second command storage unit 1441 and 1442 of the controller 130.

First, the plurality of input commands IN_CMD<1:7> may be sequentially applied as new commands INPUT COMMAND to the controller 130 from the host 102.

Specifically, the first input command IN_CMD1 among the plurality of input commands IN_CMD<1:7> applied to the controller 130 from the host 102 may contain the sequential information S as the priority information, and request a read operation R0 for the zeroth logical address.

Since the first input command IN_CMD1 contains the sequential information S, the first input command IN_CMD1 must be inputted to the second command storage unit 1442. At this time, since the second command storage unit 1442 is empty at the point of time that the first input command IN_CMD1 is inputted, the first input command IN_CMD1 may be stored as the second-first command CMD2/1 in the head HEAD2 of the second command storage unit 1442.

The second input command IN_CMD2 may contain the flexible information CP as the priority information, and request a write operation W0 for the zeroth logical address.

Since the second input command IN_CMD2 contains the flexible information CP, the second input command IN_CMD2 must be inputted to the second command storage unit 1442. At this time, the second-first command CMD2/1 having the sequential information S is stored in the head HEAD2 of the second command storage unit 1442 at the point of time that the second input command IN_CMD2 is inputted. Thus, the second-first command CMD2/1 which has been stored in the head HEAD2 of the second command storage unit 1442 may be shifted and stored as the second-second command CMD2/2, and the second input command IN_CMD2 may be stored as the new second-first command CMD2/1 in the head HEAD2 of the second command storage unit 1442.

The third input command IN_CMD3 may contain the order information O as the priority information, and request a read operation R1 for the first logical address.

Since the third input command IN_CMD3 contains the order information O, the third input command IN_CMD3 must be inputted to the first command storage unit 1441. At this time, since the first command storage unit 1441 is empty at the point of time that the third input command IN_CMD3 is inputted, the third input command IN_CMD3 may be stored as the first-first command CMD1/1 in the head HEAD1 of the first command storage unit 1441.

The fourth input command IN_CMD4 may contain the sequential information S as the priority information, and request a read operation R2 for the second logical address.

Since the fourth input command IN_CMD4 contains the sequential information S, the fourth input command IN_CMD4 must be inputted to the second command storage, unit 1442. At this time, the second-first command CMD2/1 having the flexible information CP and the second-second command CMD2/2 having the sequential information S are stored from the head HEAD2 of the second command storage unit 1442 at the point of time that the fourth input command IN_CMD4 is inputted. Thus, the fourth input command IN_CMD4 may be stored as the second-third command CMD2/3 behind the second-second command CMD2/2 in the second command storage unit 1442.

The fifth input command IN_CMD5 may contain the head information H as the priority information, and request a read operation R3 for the third logical address.

Since the fifth input command IN_CMD5 contains the head information H, the fifth input command IN_CMD5 must be inputted to the first command storage unit 1441. At this time, the first-first command CMD1/1 having the order information O is stored in the head HEAD1 of the first command storage unit 1441 at the point of time that the fifth input command IN_CMD5 is inputted. Thus, the first-first command CMD1/1 which has been stored in the head HEAD1 of the first command storage unit 1441 may be shifted and stored as the first-second command CMD1/2, and the fifth input command IN_CMD5 may be stored as the new first-first command CMD1/1 in the head HEAD1 of the first command storage unit 1441.

The sixth input command IN_CMD6 may contain the head information H as the priority information, and request a read operation R4 for the fourth logical address.

Since the sixth input command IN_CMD6 contains the head information H, the sixth input command IN_CMD6 must be inputted to the first command storage unit 1441. At this time, the first-first command CMD1/1 having the head information H and the first-second command CMD1/2 having the order information O are stored from the head HEAD1 of the first command storage unit 1441 at the point of time that the sixth input command IN_CMD6 is inputted. Thus, the first-first command CMD1/1 and the first-second command CMD1/2 which have been stored from the head HEAD1 of the first command storage unit 1441 may be shifted and stored as the first-second command CMD1/2 and the first-third command CMD1/3, and the sixth input command IN_CMD6 may be stored as the new first-first command CMD1/1 in the head HEAD1 of the first command storage unit 1441.

The seventh input command IN_CMD7 may contain the order information O as the priority information, and request a read operation R5 for the fifth logical address.

Since the seventh input command IN_CMD7 contains the order information O, the seventh input command IN_CMD7 must be inputted to the first command storage unit 1441. At this time, the first-first command CMD1/1 having the head information H, the first-second command CMD1/2 having the head information H, and the first-third command CMD1/3 having the order information O are stored from the head HEAD1 of the first command storage unit 1441 at the point of time that the seventh input command IN_CMD7 is inputted. Thus, the first-first command CMD1/1 the first-second command CMD1/2, and the first-third command CMD1/3 which have been stored from the head HEAD1 of the first command storage unit 1441 may not be shifted, but the seventh input command IN_CMD7 may be stored as the first-fourth command CMD1/4 in the tail TAIL1 of the first command storage unit 1441.

As described above, the sequence in which the plurality of input commands IN_CMD<1:7> applied from the host 102 are inputted to the first and second command storage units 1441 and 1442 may be varied according to the priority information contained in each of the input commands IN_CMD<1:7>.

In particular, the operation of distributing and storing the plurality of input commands CMD<1:7> applied from the host 102 into the first and second command storage units 1441 and 1442 according to the preset priority in FIGS. 13A and 13B can manage the plurality of input commands CMD<1:7> more simply than the operation of inputting the plurality of input commands CMD<1:7> to one command storage unit 1445 at a time.

For example, during the operation of inputting the plurality of input commands CMD<1:7> applied from the host 102 to the command storage unit 1445 at a time as illustrated in FIGS. 12A and 12B, the storage sequence of the commands having the priority information flexible information CP or the sequential information S must be shifted whenever a command having the head information H or the order information O which requests a compulsory change of the sequence is inputted from the host 102.

However, during the operation of distributing and storing the plurality of input commands CMD<1:7> applied from the host 102 into the first and second command storage units 1441 and 1442 according to the preset priority illustrated in FIGS. 13A and 13B, a command having the head information H or the order information O (which requires a compulsory change of the sequence) may be stored only in the first command storage unit 1441, and a command having the flexible information CP or the sequential information S may be stored only in the second command storage unit 1442. Thus, the frequency that the storage sequence is changed can be reduced significantly, compared to the method described with reference to FIGS. 12A and 12B.

Therefore, the method described with reference to FIGS. 13A and 13B may process commands even more efficiently than the method described with reference to FIGS. 12A and 12B.

A reason why the controller 130 manages the commands CMD1/1, CMD1/2, CMD1/3, and CMD1/4 stored in the first command storage unit 1441 in the form of a linked-list as described with reference to FIG. 13A may be that the commands CMD1/1, CMD1/2, CMD1/3, and CMD1/4 stored in the first, command storage unit 1441 contain the head information H or the order information O. In other words, the commands CMD1/1, CMD1/2, CMD1/3, and CMD1/4 stored in the first command storage unit 1441 from the head HEAD1 to the tail TAIL1 may be already aligned through the compulsory sequence change based on the flexible information. Thus, the controller 130 may need to manage the commands in the form of a linked-list, so that the commands can be executed according to the sequence in which the commands are stored in the first command storage unit 1441.

On the other hand, a reason why the controller 130 manages the commands CMD2/1, CMD2/2 and CMD2/3 stored in the second command storage units 1442 in the form of a tree-list may be that the commands CMD2/1, CMD2/2, and CMD2/3 stored in the second command storage unit 1442 contain the flexible information CP or the sequential information S. In other words, since the commands CMD2/1, CMD2/2, and CMD2/3 stored in the second command storage unit 1442 from the head HEAD2 to the tail TAIL2 are primarily aligned according to the flexible information but not forced to be aligned, the commands CMD2/1, CMD2/2, and CMD2/3 can be realigned as may be needed. Thus, the controller 130 may need to manage the commands stored in the second command storage unit 1442 in the form of a tree-list, so that the commands are basically executed according to the sequence in which the commands are stored in the second command storage unit 1442 but can be flexibly managed as may be needed.

Specifically, the case in which the controller 130 manages the commands CMD2/1, CMD2/2, and CMD2/3 stored in the second command storage unit 1442 in the form of a tree-list will now be described as an example.

First, the controller 130 may manage commands having the sequential information S, among commands inputted to the second command storage unit 1442, at a lower tree level than commands having the flexible information CP. In this case, the commands having the flexible information CP may be executed as prior to the commands having the sequential information S as possible.

The controller 130 may manage the tree-list levels among the commands having the sequential information S in the second command storage unit 1442, based on the logical address values corresponding to the respective commands of the sequential information S. That is, when a plurality of commands having the sequential information S exist, the controller 130 may properly manage the tree-list levels among the commands having the sequential information S, and determine the execution sequence thereof. At this time, the controller 130 may align the tree-list levels based on the sequence in which the plurality of commands having the sequential information S are inputted. However, the controller 130 may align the tree-list levels based on the logical address values corresponding to the plurality of commands having the sequential information S, respectively.

Furthermore, the controller 130 may manage the tree-list levels among the commands having the flexible information CP in the second command storage unit 1442, based on the logical address values corresponding to the respective commands of the flexible information CP. That is, when a plurality of commands having the flexible information CP exist, the controller 130 may properly manage the tree-list levels among the commands having the flexible information CP, and determine their execution sequence. At this time, the controller 130 may align the tree-list levels based on the sequence in which the plurality of commands having the flexible information CP are inputted. However, the controller 130 may align the tree-list levels based on the logical address values corresponding to the plurality of commands having the flexible information CP, respectively.

When a specific command among the commands having the sequential information S in the second command storage unit 1442 has not been executed for a long time but is ignored as it is, the execution time of the specific command may be excessively delayed. In this case, the host 102 may determine that an error occurred. Thus, among the commands having the sequential information S in the second command storage unit 1442, the execution sequence of a command which is not executed even after lapse of a preset time needs to be controlled, so that the command is executed prior to a command having the flexible information P. Thus, the controller 130 can transfer the command which is not executed within the preset time after being inputted to the second command storage unit 1442, among the commands having the sequential information S in the second command storage unit 1442, to a shallower tree-list level than the commands having the flexible information CP, in order to manage the command. For example, when the command of the sequential information S has been stored in the second command storage unit 1442 over a predetermined time, the command of the sequential information S may be set to have the higher priority to the command of the flexible information CP input to the memory system 110 after a lapse of the predetermined time.

In accordance with an embodiment of the present invention, the memory system may check the priorities of the plurality of commands inputted from the host, and input commands having a lower priority than a preset level and commands having a higher priority than the preset level to two different commands queues according to the check result, in order to manage the commands.

Through this operation, the two command queues can be processed more simply, thus improving the command processing speed of the memory system.

Although various embodiments have been described for illustrative purposes, it will be apparent to those skilled in the art that various changes and modifications may be made without departing from the spirit and scope of the invention as defined in the following claims.

For example, the positions and types of the logic gates and transistors used in the above-described embodiments may be set in different manners according to the polarities of input signals.

What is claimed is:

1. An operating method for a memory system including one or more memory device, the operating method comprising:
checking a priority information on a plurality of input commands;
storing the input commands having a high priority information as a first command in a first command storage unit, storing the input commands having a low priority information as a second command in a second command storage unit; and transmitting the input commands stored in the first or second command storage units for operating the memory devices, wherein the transmitting of the input commands comprises transmitting a command stored in the first command storage unit to the memory devices, prior to a command stored in the second command storage unit, wherein the storing of the input commands further comprises:

managing the first command stored in the first command storage unit in the form of a linked-list, and managing the second command stored in the second command storage unit in the form of a tree-list, wherein the low priority information comprises:

a sequential information requesting that the input commands are sequentially executed according to the input order of the input commands; and a flexible information requesting the flexible change of the execution sequence such that the input commands are executed prior to a command having the sequential information, and wherein the managing of the second command comprises storing a second command having the sequential information in the second command storage unit at a level of the tree-list, which is lower than that of a second command having the flexible information.

2. The operating method of claim 1, wherein the high priority information requests a compulsory change of an execution sequence, regardless of an input order of the input commands.

3. The operating method of claim 1, wherein the low priority information requests that the input commands are sequentially executed according to the input order of the input commands, while requesting a flexible change of the execution sequence.

4. The operating method of claim 1, wherein the managing of the second command further comprises:

managing the level of the tree-list of the second command having the sequential information based on logical address values corresponding thereto, and managing the level of the tree-list of the second command having the flexible information based on logical address values corresponding thereto.

5. The operating method of claim 4, wherein the managing of the second command further comprises transferring the second command having the sequential information, which is not executed within a preset time after being stored in the second command storage unit, to a level of the tree-list, which is higher than that of the second command having the flexible information.

6. The operating method of claim 1, wherein the high priority information comprises:

an order information requesting that the input commands must be executed prior to a command having the low priority information; and a head information requesting that the input commands must be first executed.

7. A memory system comprising:

a controller suitable for checking a priority information on a plurality of input commands, storing the input commands having a high priority information as a first command in a first command storage unit, and storing the input commands having a low priority information as a second command in a second command storage unit; and one or more memory device suitable for operating in response to the input commands stored in the first or second command storage units, wherein the controller transmits a command stored in the first command storage unit to the memory devices, prior to a command stored in the second command storage unit, wherein the controller manages the first command stored in the first command storage unit in the form of a linked-list, and manages the second command stored in the second command storage unit in the form of a tree-list, wherein the low priority information comprises:

a sequential information requesting that the input commands are sequentially executed according to the input order of the input commands;

a flexible information requesting the flexible change of the execution sequence such that the input commands are executed prior to a command having the sequential information, and wherein the controller stores a second command having the sequential information in the second command storage unit at a level of the tree-list, which is lower than that of a second command having the flexible information.

8. The memory system of claim 7, wherein the high priority information requests a compulsory change of an execution sequence, regardless of an input order of the input commands.

9. The memory system of claim 8, wherein the high priority information comprises:

an order information requesting that the input commands must be executed prior to a command having the low priority information; and a head information requesting that the input commands must be first executed.

10. The memory system of claim 7, wherein the low priority information requests that the input commands are sequentially executed according to the input order of the input commands, while requesting a flexible change of the execution sequence.

11. The memory system of claim 7, wherein the controller manages the level of the tree-list of the second command having the sequential information based on logical address values corresponding thereto, and manages the level of the tree-list of the second command having the flexible information based on logical address values corresponding thereto.

12. The memory system of claim 11, wherein the controller transfers the second command having the sequential information, which is not executed within a preset time after being stored in the second command storage unit, to a level of the tree-list, which is higher than that of the second command having the flexible information.

* * * * *